(12) United States Patent
Aldinger et al.

(10) Patent No.: US 10,516,143 B2
(45) Date of Patent: Dec. 24, 2019

(54) SEALING SYSTEM FOR A TERMINAL FEED-THROUGH

(71) Applicant: VW-VM Forschungsgesellschaft mbH & Co. KG, Ellwangen Jagst (DE)

(72) Inventors: Steffen Aldinger, Waiblingen (DE); Achim Frick, Aalen (DE); Andreas Gaugler, Ellwangen (DE); Konrad Holl, Aalen (DE); Andreas Huth, Ellwangen (DE)

(73) Assignees: VARTA Microbattery GmbH, Ellwangen Jagst (DE); VW Kraftwerk GmbH, Wolfsburg (DE)

( * ) Notice: Subject to any disclaimer, the term of this patent is extended or adjusted under 35 U.S.C. 154(b) by 5 days.

(21) Appl. No.: 15/772,837

(22) PCT Filed: Oct. 25, 2016

(86) PCT No.: PCT/EP2016/075677
§ 371 (c)(1),
(2) Date: May 2, 2018

(87) PCT Pub. No.: WO2017/076699
PCT Pub. Date: May 11, 2017

(65) Prior Publication Data
US 2018/0315966 A1  Nov. 1, 2018

(30) Foreign Application Priority Data
Nov. 3, 2015 (DE) .................. 10 2015 221 555

(51) Int. Cl.
*H01M 2/02* (2006.01)
*H01M 2/06* (2006.01)
(Continued)

(52) U.S. Cl.
CPC ............. *H01M 2/065* (2013.01); *H01M 2/06* (2013.01); *H01M 2/305* (2013.01);
(Continued)

(58) Field of Classification Search
CPC ........ H01M 2/065; H01M 2/06; H01M 2/305; H01M 2/0262; H01M 2/08; H01M 10/0525
See application file for complete search history.

(56) References Cited

U.S. PATENT DOCUMENTS 1,599,836 A   9/1926  Owen
5,518,837 A   5/1996  Pulley et al.
(Continued)

FOREIGN PATENT DOCUMENTS

DE        100 47 206 A1   6/2002
DE   10 2008 034 872 A1   1/2010
(Continued)

OTHER PUBLICATIONS

Notice of Reasons for Rejection dated Mar. 25, 2019, of counterpart Japanese Application No. 2018-510450, in English.

*Primary Examiner* — Jane J Rhee
(74) *Attorney, Agent, or Firm* — DLA Piper LLP (US)

(57) ABSTRACT

A battery includes an outer wall having a through-hole defined by a peripheral opening edge, at least one cell having a positive electrode and a negative electrode, an electrically conductive terminal stud connected to the positive electrode or the negative electrode, including a shaft extending through the through-hole, and at least one clamping element sitting on the shaft and covering the through-hole, and forming an annular gap together with the outer wall, an electrically insulating and annular support element surrounding the shaft of the terminal stud in a sleeve-like manner, and having an outward-facing peripheral contact (Continued)

surface against which the opening edge of the through-hole lies, wherein the support element includes a glass or a ceramic, or a glass- or ceramic-based composite material, and a sealing element arranged concentrically around the support element in the gap between the clamping element and the outer wall.

9 Claims, 2 Drawing Sheets

(51) Int. Cl.
    *H01M 10/0525*     (2010.01)
    *H01M 2/30*     (2006.01)
    *H01M 2/08*     (2006.01)

(52) U.S. Cl.
    CPC ...... *H01M 10/0525* (2013.01); *H01M 2/0262* (2013.01); *H01M 2/08* (2013.01)

(56) References Cited

U.S. PATENT DOCUMENTS

| | | | |
|---|---|---|---|
| 10,044,010 | B2 | 8/2018 | Dahlmann et al. |
| 2006/0094289 | A1 | 5/2006 | Kim et al. |
| 2011/0287310 | A1 | 11/2011 | Byun et al. |
| 2013/0330605 | A1* | 12/2013 | Kroll .................. C03C 3/19 429/179 |
| 2017/0012251 | A1 | 1/2017 | Shiraishi |
| 2018/0342714 | A1 | 11/2018 | Dahlmann et al. |

FOREIGN PATENT DOCUMENTS

| | | |
|---|---|---|
| DE | 10 2014 219 001 A1 | 3/2016 |
| EP | 2 620 993 A1 | 7/2013 |
| JP | 2002-124247 A | 4/2002 |
| JP | 2009-134985 A | 6/2009 |
| JP | 2015-056391 A | 3/2015 |
| JP | 2013-157133 A | 8/2015 |
| JP | 2015-167085 A | 9/2015 |
| WO | 2014/170219 A1 | 10/2014 |
| WO | 2015/125487 A1 | 3/2017 |

* cited by examiner

SEALING SYSTEM FOR A TERMINAL FEED-THROUGH

TECHNICAL FIELD

This disclosure relates to a terminal feed-through, a battery having a terminal feed-through and a method of producing such a battery.

BACKGROUND

Originally, the term "battery" described a plurality of series-connected electrochemical cells. Today, individual electrochemical cells (individual cells) are also frequently described as batteries. During discharging an electrochemical cell, an energy-releasing chemical reaction occurs that is comprised of two electrically associated, but spatially separated sub-reactions. On the negative electrode, electrons are released in an oxidation process, resulting in an electron stream flowing via an external load to the positive electrode, which takes up a corresponding quantity of electrons. A reduction process thus occurs on the positive electrode. At the same time, an ion stream corresponding to the electrode reaction is generated within the cell. This ion stream is supported by an ion-conducting electrolyte. In secondary cells and batteries, this discharge reaction is reversible, and the option is therefore available for reversal of the conversion of chemical energy into electrical energy, which occurs during discharging.

Among known secondary batteries, comparatively high energy densities are specifically achieved by lithium-ion batteries, i.e., batteries in which lithium ions migrate from one electrode to the other during charging and discharging processes. Batteries of that type are suitable for use in portable devices such as mobile telephones and notebook computers. However, they are also specifically appropriate as an energy source for motor vehicles.

Lithium-ion batteries for motor vehicles frequently comprise a prismatic metal housing. The housing is customarily comprised of a container with a rectangular base and four side walls arranged at right-angles thereto, together with a cover, which is essentially of the same size and shape as the base. In general, the cover shows virtually no contours, and can be described as virtually flat. In general, the housing is closed, wherein the edges of the cover are bonded to the opening edge of the container.

In general, at least one individual cell is arranged in the metal housing. This can be present in the form of a cell stack (stack) of a plurality of flat individual cells, or in the form of one or more wound individual cells (coil).

Stationary components of a battery generally include a positive and a negative terminal stud routed through the cover, the base or a wall of the housing, and are electrically insulated from the housing by an electrical insulator. The region of a battery housing in which a terminal stud is routed through the wall, including the electrical insulator, is commonly described as a terminal feed-through. Positive terminal studs are electrically bonded to the positive electrode(s) of the at least one individual cell. Negative terminal studs are electrically bonded to the negative electrode(s) of the at least one individual cell.

Sealing the housing in the region in which terminal studs are fed through the wall is of particular significance. Glass compounds of the type described in DE 100 47 206 A1 are appropriate for sealing, for example, and simultaneously assume the function of an electrical insulator. Moreover, polymer-based sealing systems are also specifically appropriate.

Highly stringent requirements apply to a sealing system for a terminal feed-through. In addition to an outstanding insulation and sealing performance, the following additional properties are also of particular significance:

long-term mechanical stability in response to application of external forces to terminal studs,
thermal stability of −40° C. to +100° C.,
resistance to cyclic temperature stress, and
chemical resistance to various electrolyte systems.

In general, sealing systems for terminal feed-throughs should have a minimum service life of 15 years. In the above-mentioned known sealing systems, this is not always the case. Plastic-based sealing materials are subject to embrittlement in response to long-term mechanical and chemical loading, and are consequently susceptible to stress cracking and sealing failure. Glass-based sealing materials frequently have a low elasticity and, consequently, a limited tolerance to mechanical moment loads. Abrupt application of forces can easily result in cracks, and likewise in the consequent failure of sealing.

It could therefore be helpful to provide batteries distinguished by terminal feed-throughs which fulfil the above-mentioned requirements more effectively than known solutions.

SUMMARY

We provide a battery including a metal housing having a housing outer wall having a through-hole defined by a peripheral opening edge, at least one individual cell having at least one positive electrode and at least one negative electrode arranged in an interior of the housing, an electrically conductive terminal stud connected to the at least one positive electrode or to the at least one negative electrode, including a shaft extending through the through-hole, and at least one clamping element sitting on the shaft and covering the through-hole, and forming an annular gap together with the housing outer wall, an electrically insulating and annular support element surrounding the shaft of the terminal stud in a sleeve-like manner, and having an outward-facing peripheral contact surface against which the opening edge of the through-hole lies, wherein the support element includes a glass or a ceramic, or a glass- or ceramic-based composite material, and a sealing element arranged concentrically around the support element in the gap between the clamping element and the housing outer wall.

We also provide a terminal feed-through for the battery including a metal housing having a housing outer wall having a through-hole defined by a peripheral opening edge, at least one individual cell having at least one positive electrode and at least one negative electrode arranged in an interior of the housing, an electrically conductive terminal stud connected to the at least one positive electrode or to the at least one negative electrode, including a shaft extending through the through-hole, and at least one clamping element sitting on the shaft and covering the through-hole, and forming an annular gap together with the housing outer wall, an electrically insulating and annular support element surrounding the shaft of the terminal stud in a sleeve-like manner, and having an outward-facing peripheral contact surface against which the opening edge of the through-hole lies, wherein the support element includes a glass or a ceramic, or a glass- or ceramic-based composite material, and a sealing element arranged concentrically around the support element in the gap between the clamping element and the housing outer wall, including a housing panel having a peripheral outer edge and a through-hole with a peripheral opening edge, an electrically conductive terminal stud having a shaft extending through the through-hole, and at least one clamping element, sitting on the shaft, covering the through-hole and, in combination with the housing panel, forming an annular gap, and an electrically insulating and annular support element surrounding the shaft of the terminal stud in a sleeve-like manner, and having an outward-facing peripheral contact surface against which the opening edge of the through-hole lies directly, wherein the support element includes a glass or a ceramic, or of a glass- or ceramic-based composite material.

We further provide a method of producing the battery including providing the terminal feed-through for the battery including a metal housing having a housing outer wall having a through-hole defined by a peripheral opening edge, at least one individual cell having at least one positive electrode and at least one negative electrode arranged in an interior of the housing, an electrically conductive terminal stud connected to the at least one positive electrode or to the at least one negative electrode, including a shaft extending through the through-hole, and at least one clamping element sitting on the shaft and covering the through-hole, and forming an annular gap together with the housing outer wall, an electrically insulating and annular support element surrounding the shaft of the terminal stud in a sleeve-like manner, and having an outward-facing peripheral contact surface against which the opening edge of the through-hole lies, wherein the support element includes a glass or a ceramic, or a glass- or ceramic-based composite material, and a sealing element arranged concentrically around the support element in the gap between the clamping element and the housing outer wall, including a housing panel having a peripheral outer edge and a through-hole with a peripheral opening edge, an electrically conductive terminal stud having a shaft extending through the through-hole, and at least one clamping element, sitting on the shaft, covering the through-hole and, in combination with the housing panel, forming an annular gap, and an electrically insulating and annular support element surrounding the shaft of the terminal stud in a sleeve-like manner, and having an outward-facing peripheral contact surface against which the opening edge of the through-hole lies directly, wherein the support element includes a glass or a ceramic, or of a glass- or ceramic-based composite material, and injecting a liquid polymer compound into the gap between the housing panel and the clamping element to form a sealing element in the gap.

DETAILED DESCRIPTION

Figure 1:
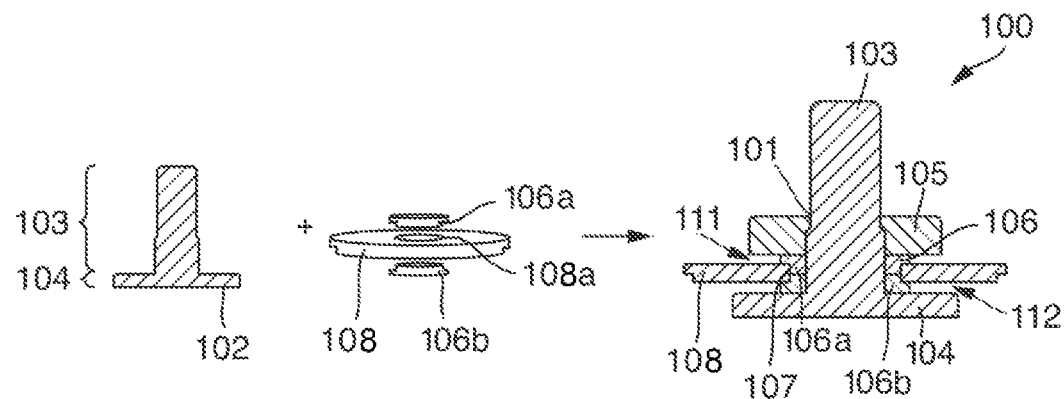
FIG. 1 shows a schematic representation of the components of a preferred example of the terminal feed-through in the assembled state (cross-sectional representation, to the right) and partially also in the unassembled state (to the left).

Our batteries comprise a housing, and at least one individual cell having at least one positive electrode and at least one negative electrode in a or the interior of the housing. The individual cell is preferably a cell of a lithium-ion-based design. Correspondingly, the batteries are preferably lithium-ion batteries.

The individual cell is preferably constituted in the form of a composite structure of electrode foils and separator foils, in the following sequence: positive electrode/separator/negative electrode. The electrodes preferably comprise metallic current collectors generally constituted in the form of two- or three-dimensional preforms. In lithium-ion batteries, for example, on the side of the positive electrode, an aluminum mesh or film is located, for example, an expanded aluminum mesh or a perforated aluminum foil. On the side of the negative electrode, copper meshes or foils are generally employed as current collectors. As in known batteries, the battery can also comprise a cell stack (stack) of a plurality of flat individual cells, or one or more wound individual cells (coil).

The housing shields the at least one individual cell from its surroundings and is preferably of a gas- and liquid-tight design. As in known housings, it generally assumes a prismatic form, and comprises a container having a rectangular base and four side walls arranged at right-angles thereto, together with a cover, which is essentially of the same size and shape as the base. If the housing is closed, in this form with four side walls, a base and a cover, it comprises a total of six housing outer walls. A metal composition of the housing is particularly preferred, specifically of aluminum or an aluminum alloy.

A stationary constituent of a battery is an electrically conductive terminal stud connected to either the at least one positive electrode or to the at least one negative electrode. Preferably, the battery comprises both a positive terminal stud electrically connected to the at least one positive electrode, and a negative terminal stud electrically connected to the at least one negative electrode. Our batteries may comprise both a positive and a negative terminal stud. However, it is also possible for the housing itself to function as the positive or negative terminal. In this case, a battery may comprise only a positive terminal stud, or only a negative terminal stud.

The housing of a battery comprises at least one housing outer wall that incorporates at least one through-hole defined by a peripheral opening edge. The housing outer wall having the at least one through-hole is preferably the base or the cover of the housing.

The electrically conductive terminal stud comprises a shaft fed through the through-hole. It further comprises at least one clamping element that sits on the shaft and covers the through-hole and, in combination with the housing outer wall, forms or encloses an annular gap. The battery preferably comprises a terminal stud having two such clamping elements. The primary function of the two clamping elements is to secure the shaft of the terminal stud in the through-hole in the housing outer wall, and prevent any slipping of the terminal stud. In the assembled state, the clamping elements can exert a clamping force upon components which are arranged between the latter.

In simple forms, the shaft of the terminal studs preferably comprises a stem with an external thread, and two nuts arranged to rotate in opposing directions and that sit on the stem, as clamping elements. Preferably, however, the terminal stud is configured with a bolt-type design. In this case, the at least one clamping element preferably comprises the head of such a bolt-type terminal stud, and a nut, by which the bolt-type terminal stud is secured.

Constituent elements of the battery are at least one electrically insulating support element and at least one sealing element. In combination, these constitute a sealing system for a terminal feed-through.

The electrically insulating support element is preferably of annular design, and surrounds the shaft of the terminal stud in a sleeve-like manner. The support element comprises an inward-facing contact surface, in the direction of the enclosed shaft, and an outward-facing contact surface. The inward-facing contact surface is preferably in direct contact with the shaft. The outward-facing contact surface is preferably in direct contact with the opening edge of the through-hole. Conversely, the opening edge of the through-hole preferably lies directly on the outward-facing contact surface of the support element. In other words, the terminal studs can be supported on the housing edge, via the support element.

It is specifically preferred if the outward-facing contact surface of the support element not only lies in direct contact with the opening edge of the through-hole, but the outward-facing contact surface of the support element preferably simultaneously delimits the annular gap formed by the clamping element and the housing outer wall to the interior, specifically such that, within the gap, direct contact of other components of the terminal feed-through, for example, the at least one sealing element, with the terminal stud is excluded.

The sealing element is preferably arranged in the gap between the clamping element and the housing outer wall, preferably in a concentric arrangement around the support element. Preferably, it entirely occupies the gap. However, the direct contact region between the opening edge of the through-hole and the shaft of the terminal stud is preferably free of sealing material. This contact region is accommodated by the support element.

Mechanical loads acting on the shaft of the terminal stud or on the housing outer wall can be accommodated by the support element, and do not act on the sealing element. The sealing system comprised of the support element and the sealing element ensures that mechanical forces acting both axially and radially on the terminal studs only affect the support element directly. Conversely, the sealing element is kept free of mechanical loads, and its service life can thus be significantly increased.

It is specifically preferred if the sealing element is not for instance a prefabricated component, which can be combined with the support element and further components to form a terminal feed-through. Rather, it is preferred that the sealing component should be formed in direct contact with a number of the above-mentioned components, specifically in direct and simultaneous contact with the clamping element and the housing outer wall and, where applicable, with the outward-facing contact surface of the support element. Or, in other words, the sealing element is preferably formed directly in the gap.

It is specifically preferred if the sealing element is formed by injection-molding, preferably directly in the gap.

In specifically preferred forms, the support element incorporates an annular groove in which the opening edge of the through-hole is accommodated. The annular groove is preferably arranged on the outward-facing contact surface of the support element, or the annular groove forms the outward-facing contact surface of the electrically insulating support element, or at least a part thereof. It is specifically preferred if the opening edge of the through-hole is secured in the annular groove such that a positive fit is formed in the axial direction.

The support element is preferably a support ring, specifically a support ring which is comprised of two annular half-sections. This applies specifically, if the above-mentioned positive fit is achieved.

The support element is preferably comprised of a glass, a ceramic, a glass-ceramic or a glass- or ceramic-based composite material.

The sealing element is preferably comprised of a plastic. Appropriate plastics include, for example, polyamide, polyether ketone, polyether ether ketone and polysulfone.

The terminal stud, including the shaft and, where applicable, the clamping element(s), is preferably comprised of metal. Copper may be mentioned specifically as a preferred metal.

The terminal feed-through preferably comprises at least three components, namely
  a housing panel having a peripheral outer edge and a through-hole with a peripheral opening edge,
  an electrically conductive terminal stud having a shaft fed through the through-hole, and at least one clamping element that sits on the shaft, covers the through-hole and, in combination with the housing panel, forms a gap, and
  an electrically insulating support element surrounding the shaft of the terminal stud in a sleeve-like manner, and having an outward-facing peripheral contact surface, against which the opening edge of the through-hole lies directly.

The terminal feed-through is specifically employed in the production of our batteries. Appropriate terminal studs and support elements have already been adequately described. Accordingly, only the housing panel requires more detailed description. In principle, the housing panel can constitute a full housing outer wall of the housing of our battery, for example, the cover or the base of the battery. It is specifically preferred, however, if the housing panel constitutes only a sub-region of a housing outer wall. It is specifically preferred if the housing panel is configured as a circular disk, or with a rectangular design. The housing panel is preferably comprised of the same material as the above-mentioned housing of the battery.

In specifically preferred forms, the terminal feed-through comprises the above-mentioned sealing element arranged concentrically around the support element in the gap between the clamping element and the housing outer wall.

The terminal feed-through can specifically be installed in the above-mentioned battery in the context of the method. The method preferably comprises the following steps:
  a terminal feed-through is provided, comprising the above-mentioned housing panel, the electrically conductive terminal stud and the electrically insulating support element,
  for the formation of a sealing element, a liquid polymer compound is injected into the gap between the housing panel and the clamping element,
  in a further possible step, a housing outer wall, for example, a cover is provided, having a through-hole defined by an opening edge, and
  in a further possible step, the terminal feed-through is inserted in the through-hole in the housing outer wall, and the housing panel is bonded to the housing wall.

It is preferred that the size and shape of the housing panel of the terminal feed-through essentially correspond to the size and shape of the through-hole in the housing outer wall provided. For closure of the through-hole in the housing outer wall, it is then possible to insert the terminal feed-through in the through-hole such that the peripheral outer edge of the housing panel can be bonded with the opening edge of the through-hole in the housing outer wall.

Further characteristics and advantages proceed from the following description of the drawings, with reference to which the examples are illustrated. The examples described hereinafter are intended solely for the clarification and improved understanding, and are not, under any circumstances, to be interpreted as restrictive.

FIG. 1 shows a schematic representation of the components of a preferred example of the terminal feed-through 100, in the assembled state (cross-sectional representation, to the right) and partially also in the unassembled state (to the left). The terminal stud 101 comprises a number of components, namely, a terminal bolt 102 consisting of the shaft 103 and the bolt head 104, together with the nut 105 (not shown in the unassembled state). The bolt head 104 and the nut 105 function as clamping elements. On its outer side, the shaft 103 incorporates an external thread (not represented). The nut 105 incorporates a (likewise unrepresented) internal thread that can cooperate with the external thread of the shaft 103. An electrically insulating annular support element 106 encloses the shaft 103 in a sleeve-like manner. It is comprised of two annular half-sections 106a and 106b. On its outer side, the support element incorporates a peripheral annular groove 107.

The terminal feed-through further comprises a housing panel 108 in the form of a circular disk, having a central through-hole defined by a peripheral opening edge 108a. In the assembled state (to the right), this opening edge 108a is secured in the annular groove 107 such that a positive fit is formed in the axial direction. The shaft 103 of the terminal stud and the support element 106 that encloses the shaft in a sleeve-like manner, close the through-hole defined by the opening edge 108a. Moreover, in the assembled state, both the nut 105 and bolt head 104 cover the through-hole in the housing panel 108 defined by the peripheral opening edge 108a.

The clamping element 105 and the housing panel 108 enclose an annular gap 111. The clamping element 105 and the housing panel 108 enclose an annular gap 112. The gap 110 and the gap 111 are respectively delimited to the interior by the support element 106.

Figure 2:
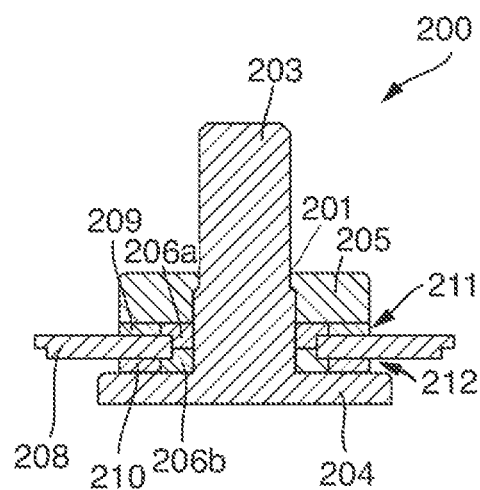
FIG. 2 shows a terminal feed-through (represented in cross-section) that differs from the terminal feed-through represented in FIG. 1 in that it additionally includes two sealing elements.

FIG. 2 shows a terminal feed-through 200 (represented in cross-section) that differs from the terminal feed-through 100 represented in FIG. 1 in that it additionally comprises two sealing elements 209 and 210. Annular gaps 211 and 212 are located between the bolt head 204 and the housing panel 208 on one side, and between the nut 205 and the housing panel 208 on the other side. The gaps are occupied by the sealing elements 209 and 210. For formation of the sealing elements, liquid polymer compounds are introduced into the gaps 211 and 212 by injection-molding in each case, and are cured therein.

Figure 3:
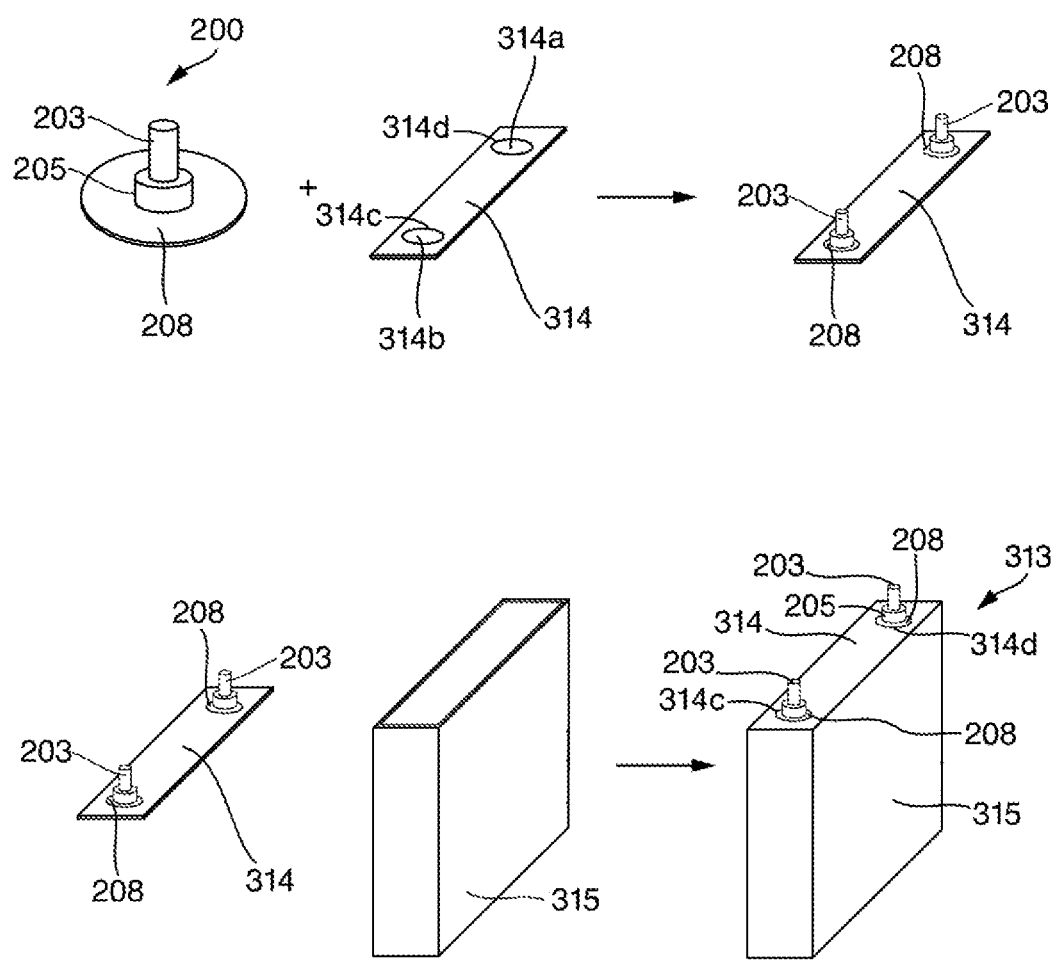
FIG. 3 shows a schematic illustration of the processing of the terminal feed-through illustrated in FIG. 2, in a battery.

FIG. 3 shows a schematic illustration of the processing of the terminal feed-through 200 illustrated in FIG. 2, in a battery 313.

To this end, a housing cover 314 incorporates two circular through-holes 314a and 314b. The through-hole 314a is defined by the opening edge 314d. The through-hole 314b is defined by the opening edge 314c. The diameter of the circular through-holes 314a and 314b is configured such that a terminal feed-through 200 can be fitted in each of the through-holes, thus permitting the bonding of the edges of the housing panels 208 with the opening edges 314c and 314d. The housing panels 208 thus constitute an element of the housing cover 314, and consequently an element of a housing outer wall. In the interests of clarity, only the components 203, 205 and 208 of the terminal feed-through 200 are represented (viewed obliquely from above).

In a next step, a prismatic container 315 can then be provided, having a rectangular base and four side walls arranged at right-angles thereto, in which at least one individual cell having at least one positive and at least one negative electrode (not represented) has been inserted. Further to the connection of the terminal studs to the electrodes of the individual cell, the housing cover 314 is fitted to the container 315, and is bonded to the latter by welding.

The invention claimed is:

1. A battery comprising:
    a metal housing having a housing outer wall having a through-hole defined by a peripheral opening edge,
    at least one individual cell having at least one positive electrode and at least one negative electrode arranged in an interior of the housing,
    an electrically conductive terminal stud connected to the at least one positive electrode or to the at least one negative electrode, comprising a shaft extending through the through-hole, and at least one clamping element sitting on the shaft and covering the through-hole, and forming an annular gap together with the housing outer wall,
    an electrically insulating and annular support element surrounding the shaft of the terminal stud in a sleeve-like manner, and having an outward-facing peripheral contact surface against which the opening edge of the through-hole lies, wherein the support element comprises a glass, a ceramic, or a glass- or ceramic-based composite material, and
    a sealing element comprising a plastic and arranged concentrically around the support element in the gap between the clamping element and the housing outer wall.

2. The battery as claimed in claim 1, wherein the sealing element is formed in the gap and/or by injection-molding.

3. The battery as claimed in claim 1, wherein the support element incorporates an annular groove in which the opening edge of the through-hole is accommodated.

4. The battery as claimed in claim 1, wherein the support element comprises two annular half-sections.

5. The battery as claimed in claim 1, wherein the terminal stud comprises metal.

6. A terminal feed-through for the battery according to claim 1, comprising:
    a housing panel having a peripheral outer edge and a through-hole with a peripheral opening edge,
    an electrically conductive terminal stud having a shaft extending through the through-hole, and at least one clamping element sitting on the shaft, covering the through-hole and, in combination with the housing panel, forming an annular gap, and
    an electrically insulating and annular support element surrounding the shaft of the terminal stud in a sleeve-like manner, and having an outward-facing peripheral contact surface against which the opening edge of the through-hole lies directly.

7. The terminal feed-through as claimed in claim 6, further comprising a sealing element arranged concentrically around the support element in the gap between the clamping element and the housing panel.

8. A method of producing the battery, comprising:
    providing a terminal feed-through as claimed in claim 6, and injecting a liquid polymer compound into the gap between the housing panel and the clamping element to form a sealing element in the gap.

9. The method as claimed in claim 8, further comprising:
providing a housing wall having a through-hole, and
closing the through-hole by insertion of the terminal feed-through in the through-hole, and
bonding the housing panel with the housing wall.

* * * * *